United States Patent [19]

Yazaki et al.

[11] Patent Number: 4,877,662

[45] Date of Patent: Oct. 31, 1989

[54] VESSEL COMPRISING RESIN COMPOSITION

[75] Inventors: Jinichi Yazaki, Tokyo; Akihiko Tamura, Chigasaki, Japan

[73] Assignee: Toyo Seikan Kaisha, LTD., Tokyo, Japan

[21] Appl. No.: 909,726

[22] Filed: Sep. 22, 1986

[30] Foreign Application Priority Data

Sep. 20, 1985 [JP] Japan ................................ 60-206602
Sep. 20, 1985 [JP] Japan ................................ 60-206603

[51] Int. Cl.$^4$ ............................................. B32B 27/08
[52] U.S. Cl. ..................................... 428/36.7; 428/515
[58] Field of Search ...................... 428/35, 515; 525/57

[56] References Cited

U.S. PATENT DOCUMENTS

| | | | |
|---|---|---|---|
| 3,931,449 | 1/1976 | Hirata et al. | 428/35 |
| 3,932,692 | 1/1976 | Hirata et al. | 428/35 |
| 3,975,463 | 8/1976 | Hirata et al. | 428/35 |
| 4,254,169 | 3/1981 | Schroeder | 428/35 |
| 4,511,610 | 4/1985 | Yazaki et al. | 428/35 |
| 4,613,644 | 9/1986 | Moritani et al. | 524/434 |
| 4,645,695 | 2/1987 | Negi et al. | 428/35 |

FOREIGN PATENT DOCUMENTS

| | | | |
|---|---|---|---|
| 0020994 | 7/1979 | Japan | 428/35 |
| 0050970 | 5/1981 | Japan | 525/57 |
| 0032844 | 2/1985 | Japan | 525/57 |
| 0157655 | 10/1985 | Japan | 525/57 |

*Primary Examiner*—Nancy A. B. Swisher
*Attorney, Agent, or Firm*—Sherman and Shalloway

[57] ABSTRACT

A stabilizer selected from alkaline earth metal hydroxides, oxides and silicates and alkaline earth metal salts of higher fatty acids and an antioxidant are incorporated into a resin composition comprising an ethylene/vinyl alcohol copolymer and a propylene resin or a carbonyl group-containing thermoplastic resin. The stability of the resin composition is improved, and deterioration of the resin composition such as gelation, discoloration or reduction of the gas barrier property is prevented when this composition is heat-molded into a vessel.

6 Claims, No Drawings

VESSEL COMPRISING RESIN COMPOSITION

BACKGROUND OF THE INVENTION

(1) Field of the Invention

The present invention relates to a vessel comprising a composition having an improved stability, which comprises an ethylene/vinyl alcohol copolymer and a propylene resin or a thermoplastic resin having in the main chain or side chain a carbonyl group derived from a carboxylic acid, carboxylic acid salt, carboxylic anhydride, carboxylic acid amide, carboxylic acid ester or carbonic acid ester. More particularly, the present invention relates to an improvement by which the above-mentioned resin composition is stabilized against gelation, discoloration and reduction of gas barrier properties caused when the resin composition is heat-molded into a vessel. Moreover, the present invention relates to a single-layer or multiple-layer plastic vessel having at least one layer composed of the above-mentioned resin composition.

(2) Description of the Prior Art

Among various resins, an ethylene/vinyl alcohol copolymer is one of resins most excellent in the resistance against permeation of gases such as oxygen, and this resin is widely used in packaging vessels such as bottles and cups and films where this characteristic is utilized.

This ethylene/vinyl alcohol copolymer is sensitive to the moisture, and the resin is defective in that under such a high moisture condition as a relative humidity of 100%, the oxygen permeation coefficient is increased about 10 times. As means for eliminating this defect, there have been widely adopted a method in which the ethylene/vinyl alcohol copolymer is blended with a lowly water-absorbing resin excellent in the resistance against permeation of steam or water vapor, such as polyethylene or polypropylene, and a method in which a gas barrier layer comprising this copolymer is sandwiched between inner and outer surface layers of the above-mentioned lowly water-absorbing resin to form a laminate structure in which the influence of the moisture on the ethylene/vinyl alcohol copolymer is reduced.

In Japanese Patent Publication No. 30104/76, it is taught that when a two-component or three-component resin composition comprising an ethylene/vinyl alcohol copolymer, a polyolefin and optionally a thermoplastic resin having a carboxylic acid group or its derivative group is extrusion-molded under certain conditions, there can be obtained a molded structure having a layer in which the ethylene/vinyl alcohol copolymer or polyolefin is preferentially distributed.

Furthermore, in Japanese Patent Publication No. 11263/77, it is taught that when an ethylene/vinyl alcohol copolymer and a polyolefin are co-extruded, if a thermoplastic resin having a carboxylic acid group or its derivative group is incorporated in one or both of the two resin layers, the interlaminar adhesiveness between the two resin layers can be improved.

A multi-layer plastic vessel comprising a polypropylene layer excellent in the moisture resistance and mechanical characteristics and an ethylene/vinyl alcohol copolymer layer excellent in the oxygen barrier property, which are laminated through an adhesive lyer composed of a maleic anhydride-modified polyolefin, is used in the fields of cosmetics, chemicals and toiletry products as a vessel excellent in the content-preservative property in the form of a bottle, a cup, a pouch or the like.

Furthermore, in forming a bottle or cup, scraps of the laminate or layer are inevitably formed, and these scraps are used as the regrind and reclaimed as constituents of the co-extrudate laminate.

However, if a blend comprising an ethylene/vinyl alcohol copolymer, a thermoplastic resin having a carboxylic acid group or its derivative group and optionally a polypropylene is placed under melt-molding conditions, deterioration such as gelation, discoloration (scorching) or degradation of the gas barrier property is caused. From the results of research made by us, it was confirmed that the deterioration of this resin composition is due to deterioration of the ethylene/vinyl alcohol copolymer, and no effective means for preventing this deterioration has been developed.

SUMMARY OF THE INVENTION

We found that if a compound such as a hydroxide or higher fatty acid salt of an alkaline earth metal and an antioxidant are incorporated into a composition comprising an ethylene/vinyl alcohol copolymer and a propylene resin or a thermoplastic resin having a carboxylic acid group or its derivative group, deterioration of the copolymer under heat-molding conditions is effectively prevented.

It is a primary object of the present invention to provide a vessel having at least one layer composed of a stabilized resin composition in which the above-mentioned defects of the conventional resin composition are eliminated.

Another object of the present invention is to provide a novel resin composition in which deterioration such as gelation, discoloration or reduction of the gas barrier property is effectively prevented even if the resin composition is exposed to heat-melting conditions, especially when the resin composition is repeatedly exposed to heat-melting conditions.

Still another object of the present invention is to provide a plastic vessel composed of the above-mentioned resin composition, in which discoloration or adhesion of a foreign substance is not caused and the appearance characteristics and gas barrier properties are excellent.

Still another object of the present invention is to provide a resin composition which is excellent in the heat moldability and the molding operation efficiency so that adhesion of the resin composition to a die or residence of a foreign substance in an extruder is prevented.

Still another object of the present invention is to provide a single-layer or multiple-layer plastic vessel comprising at least one layer composed of the above-mentioned resin.

A further object of the present invention is to provide a multiple-layer plastic vessel in which a scrap resin produced at the step forming the vessel is effectively reclaimed.

In accordance with one fundamental aspect of the present invention, there is provided a vessel comprising at least one constituent layer comprised of a resin composition comprising (i) an ethylene/vinyl alcohol copolymer, (ii) a resin selected from the group consisting of a propylene resin and a polar group-containing thermoplastic resin having in the main chain or side chain a carbonyl group derived from a compound selected from the group consisting carboxylic acids, carboxylic acid salts, carboxylic anhydrides, carboxylic acid amides, carboxylic acid esters and carbonic acid esters, (iii) at least one stabilizer selected from the group consisting of alkaline earth metal hydroxides, oxides and silicates and alkaline earth metal salts of higher fatty acids and (iv) an antioxidant.

In accordance with another fundamental aspect of the present invention, there is provided a vessel comprising at least one constituent layer composed of a resin composition comprising (i) an ethylene/vinyl alcohol copolymer, (ii) a polar group-containing thermoplastic resin having in the main chain or side chain a carbonyl group derived from a compound selected from the group consisting of carboxylic acids, carboxylic acid salts, carboxylic anhydrides, carboxylic acid amides, carboxylic acid esters and carbonic acid esters, (iii) at least one stabilizer selected from alkaline earth metal hydroxides, oxides and silicates and alkaline earth metal salts of higher fatty acids, (iv) an antioxidant and (v) an olefin resin.

DETAILED DESCRIPTION OF THE PREFERRED EMBODIMENTS

As pointed out hereinbefore, the present invention is based on the finding that if (iii) at least one stabilizer selected from the group consisting of alkaline earth metal hydroxides, oxides and silicates and alkaline earth metal salts of higher fatty acids and (iv) an antioxidant are incorporated into a resin composition comprising (i) an ethylene/vinyl alcohol copolymer, (ii) a propylene resin or a polar group-containing thermoplastic resin having in the main chain or side chain a carbonyl group derived from a compound selected from the group consisting of carboxylic acids, carboxylic acid salts, carboxylic anhydrides, carboxylic acid amides, carboxylic acid esters and carbonic acid esters and optionally, (v) an olefin resin, deterioration such as gelation, discoloration (scorching) or reduction of the gas barrier property is effectively prevented when this resin composition is placed under heat-melting conditions.

Occurrence of the above-mentioned deterioration of the ethylene/vinyl alcohol copolymer in the form of the above-mentioned resin composition under heat-melting conditions is a very peculiar phenomenon, and the cause of this phenomenon has not been elucidated. Moreover, if gelation of this ethylene/vinyl alcohol copolymer is caused, residence of the gelled copolymer as a foreign substance in an extruder or adhesion of the gelled copolymer to a die is caused, and furthermore, adhesion of the foreign substance to a molded article such as a vessel or breaking of the layer is caused. Moreover, a discolored substance (scorched substance) is incorporated into the molded article to degrade the appearance characteristics and the gas barrier property to oxygen or the like is drastically degraded.

From the results of research made by us, it has been confirmed that the deterioration of the ethylene/vinyl alcohol copolymer is due to the fact that a carboxylic acid group or carboxylic anhydride group is present in the carbonyl group-containing thermoplastic resin or even if such a group is not present under ordinary conditions, a carboxylic acid group or carboxylic anhydride group is formed by thermal decomposition or hydrolysis under heat-melting conditions, and that this group causes gelation, discoloration and reduction of the gas barrier property in the ethylene/vinyl alcohol copolymer in the molten state. The reaction course of this deterioration has not been completely elucidated, but in view of the foregoing phenomenon, it is presumed that the reaction is a complicated radical reaction including dehydration (isolation of the hydroxyl group), esterification and crosslinking.

Furthermore, from the results of our research, it is presumed that the above-mentioned deterioration of the ethylene/vinyl alcohol copolymer is due also to crosslinking or cutting of the molecule by titanium trichloride ($TiCl_3$) contained as the catalyst residue in the propylene resin or other reaction residue.

More specifically, a Ziegler-Natta catalyst, for example, $3TiCl_3 \cdot AlCl_3 + Al(C_2H_5)_2Cl$, is used as the catalyst for polymerization of propylene, and $TiCl_3$ or its reaction product is contained in a propylene resin, though in a minute amount. It is considered that since the ethylene/vinyl alcohol copolymer exposed to the melting temperature is present together with the propylene resin at the extrusion step, crosslinking reaction or cutting of the molecule is promoted in the ethylene/vinyl alcohol copolymer to advance the deterioration.

In the case where the above-mentioned resin composition contains a scrap resin formed when a multilayer plastic vessel comprising a propylene resin layer and an ethylene/vinyl alcohol copolymer layer is prepared, since this scrap resin has been once subjected to a severe operation such as melt extrusion, deterioration has already been advanced in the ethylene/vinyl alcohol copolymer in the scrap resin. Accordingly, if this scrap resin is reclaimed for formation of a vessel, it is considered that by the action of $TiCl_3$ as the catalyst residue or the like, the deterioration of the ethylene/vinyl alcohol copolymer is promptly advanced.

Many and various inorganic and organic compounds are known as the compound reacting with the acid. According to the present invention, it was found that among these compounds, an alkaline earth metal hydroxide, oxide or silicate or an alkaline earth metal salt of a higher fatty acid is especially effective for preventing the above-mentioned deterioration and if this compound is used in combination with an antioxidant, the preventing effect is further enhanced.

The present invention will now be described in detail.

Ingredients

The ethylene/vinyl alcohol copolymer (i) used in the present invention contains 30 to 80 mole% of vinyl alcohol units, and this copolymer is obtained by saponifying an ethylene/vinyl acetate copolymer, especially to a saponification degree of at least 99%.

The molecular weight of the saponified ethylene/vinyl acetate copolymer is not particularly critical, so far as it is a film-forming molecular weight. The viscosity of the saponified ethylene/vinyl acetate copolymer is ordinarily measured by using a mixed solvent comprising 85% by weight of phenol and 15% by weight of water, and a saponified copolymer having an intrinsic viscosity ($\eta$) of 0.07 to 0.17 l/g as measured at 30° C. by using this mixed solvent is preferred for attaining the objects of the present invention. If the intrinsic viscosity ($\eta$) is lower than 0.07 l/g, the mechanical strength of the molded article is insufficient, and if ($\eta$) is higher than 0.17 l/g, the moldability of the resin composition is degraded.

The propylene resin, which is one type of the resin (ii) to be used in combination with the ethylene/vinyl alcohol copolymer, is a crystalline propylene resin formed by homopolymerizing propylene by using a so-called Ziegler-Natta catalyst or a crystalline propylene copolymer resin composed mainly of propylene, obtained by copolymerizing propylene with other olefin such as ethylene or butene-1 by using a Ziegler-Natta catalyst. Furthermore, a crystalline copolymer resin obtained by graft-polymerizing or block-polymerizing ethylene or a compound having an ethylenically unsaturated bond to a crystalline propylene resin as described above by using a Ziegler-Natta catalyst or other polymerization catalyst can also be used.

Another type of the resin (ii) to be used in combination with the ethylene/vinyl alcohol copolymer is a polar group-containing thermoplastic resin having in the main chain or side chain a carbonyl group-containing group derived from a free carboxylic acid, a carboxylic acid salt, a carboxylic anhydride, a carboxylic acid amide, a carboxylic acid ester or a carbonic acid ester. Specific examples of the polar group-containing thermoplastic resin will now be described, though thermoplastic resins that can be used are not limited to those exemplified below.

(a) Homopolymers or copolymers of monomers represented by the following general formula:

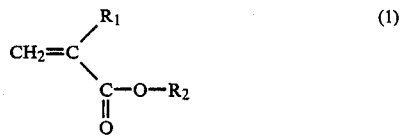

wherein $R_1$ stands for a hydrogen atom or a lower alkyl group and $R_2$ stands for a hydrogen atom or an alkyl group having 1 to 12 carbon atoms,
and copolymers of monomers represented by the above formula (1) with olefins or other vinyl monomers, such as polyacrylic acid esters, polymethacrylic acid esters, ethylene/acrylic acid ester copolymers, acrylic acid ester/acrylic acid copolymers, acrylic acid-grafted polyethylene, acrylic acid-grafted polypropylene, methacrylic acid-grafted polyethylene, ethylene/acrylic acid ester/acrylic acid copolymers, ethylene/acrylic acid copolymers, styrene/methacrylic acid ester/acrylic acid copolymers, acrylic acid ester/vinyl chloride copolymers, methacrylic acid ester/vinyl chloride copolymers, styrene/methacrylic acid ester/butadiene copolymers and methacrylic acid ester/acrylonitrile copolymers.

(b) Homopolymers or copolymers of carboxylic acid vinyl esters represented by the following general formula:

wherein $R_3$ stands for a hydrogen atom, an alkyl group or a phenyl group,
and copolymers of the formula (2) with olefins or other vinyl monomers, such as polyvinyl acetate, polyvinyl propionate, ethylene/vinyl acetate copolymers, acrylic acid ester/vinyl acetate copolymers and vinyl chloride/vinyl acetate copolymers.

(c) Ionomers, that is, resins obtained by neutralizing copolymers of olefins with unsaturated carboxylic acid and optionally other vinyl monomers, with an alkali metal, an alkaline earth metal or an organic base, such as Surlyns supplied by du Pont.

(d) Copolymers of maleic anhydride with other vinyl monomer and copolymers obtained by grafting maleic anhydride to polyolefins, such as maleic anhydride-grafted polyethylene, maleic anhydride-grafted polypropylene and maleic anhydride/vinyl chloride copolymers.

(e) Polyamides comprising recurring units represented by the following general formula:

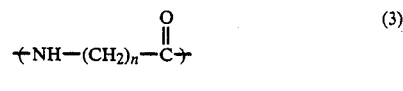

or

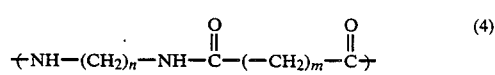

wherein n is a number of from 3 to 13 and m is a number of from 4 to 11,
such as poly-ω-aminocaproic acid, poly-ω-aminoheptanoic acid, poly-ω-aminocaprylic acid, poly-ω-aminopelagonic acid, poly-ω-aminodecanoic acid, poly-ω-aminoundecanoic acid, poly-ω-aminododecanoic acid, poly-ω-aminotridecanoic acid, polyhexamethylene adipamide, polyhexamethylene sebacamide, polyhexamethylene dodecamide, polyhexamethylene tridecamide, polydecamethylene adipamide, polydecamethylene sebacamide, polydecamethylene dodecamide, polydecamethylene tridecamide, polydodecamethylene adipamide, polydodecamethylene sebacamide, polydodecamethylene dodecamide, polydodecamethylene tridecamide, polytridecamethylene adipamide, polytridecamethylene sebacamide, polytridecamethylene dodecamide, polytridecamethylene tridecamide, polyhexamethylene azelamide, polydecamethylene azelamide, polydodecamethylene azelamide, polytridecamethylene azelamide and copolyamides of two or more of them.

Furthermore, partially aromatic polyamides derived rom p- and/or m-xylylene diamine and a dibasic acid such as adipic acid or sebacic acid may be used.

(f) Polyesters comprising recurring units represented by the following formula:

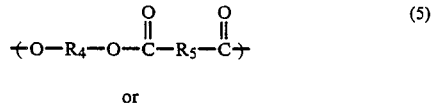

or

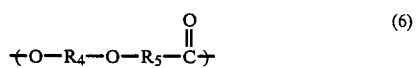

wherein $R_4$ stands for an alkylene group having 2 to 6 carbon atoms and $R_5$ stands for an alkylene or arylene group having 2 to 24 carbon atoms,
such as polyethylene adipate, polyethylene sebacate, polyethylene terephthalate, polytetramethylene isophthalate, polyethylene terephthalate/isophthalate and polybutylene terephthalate.

Furthermore, bisphenol A terephthalate, bisphenol A isphthalate and a copolymer thereof may be used.

(g) Polycarbonates represented by the following general formula:

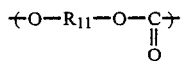

wherein $R_{11}$ stands for a hydrocarbon group having 8 to 15 carbon atoms,
such as poly-p-xylene glycol biscarbonate, poly-dioxydiphenylmethane carbonate, poly-dioxydiphenylethane carbonate, poly-dioxydiphenyl-2,2-propane carbonate and poly-dioxydiphenyl-1,1-ethane carbonate.

It is preferred that the polar group-containing thermoplastic resin used in the present invention should contain a carbonyl group derived from a free carboxylic acid, a carboxylic acid salt, a carboxylic acid ester, a carboxylic acid amide, a carboxylic anhydride or a carbonic acid ester at a concentration of 5 to 1000 meq (milliequivalent) per 100 g of the polymer.

The polar group-containing thermoplastic resin is substantially linear, and should be molten at a melt-molding temperature of the final resin composition, for example, 170° to 300° C., preferably at a temperature of 180° to 250° C.

Of course, these polar group-containing thermopolastic resins may be used singly or in the form of a mixture of two or more of them.

Any of polyolefins customarily used for the production of films or vessels can be optionally used as the olefin resin (v) in combination with the above-mentioned resin components. For example, homopolymers and copolymers of olefins represented by the following general formula:

wherein R stands for a hydrogen atom or an alkyl group having up to 4 carbon atoms.

In order to impart a sufficient mechanical strength to the final molded structure, it is important that such an olefin homopolymer or copolymer should be crystalline. As examples of the polyolefin satisfying this requirement, there can be mentioned low-density polyethylene, medium-density polyethylene, high-density polyethylene, isotactic polypropylene, a crystalline ethylene/propylene copolymer, polybutene-1 and polypentene-1. Of course, the polyolefin that is used in the present invention is not limited to an olefin homopolymer or a copolymer of two or more of olefins, but a copolymer of an olefin with a small amount of other comonomer in a range not substantially changing the properties of the polyolefin, for example, up to 5 mole% of other ethylenically unsaturated monomer, may be used.

The molecular weight of the polyolefin is within a film-forming range. For example, a polyolefin having an average molecular weight of 5000 to 400000 (melt index MI of 0.05 to 5.0 g/10 min (ASTM-1238)) is ordinarily preferred.

A polyolefin having an aromatic hydrocarbon group as the suspending group R, for example, polystyrene or a styrene/butadiene copolymer, may be used as the olefin resin.

According to the present invention, at least one stabilizer selected from the group consisting of hydroxides, oxides, silicates and higher fatty acid salts of alkaline earth metals such as magnesium, barium and calcium is incorporated into the above-mentioned resin components. As the higher fatty acid salt, there can be mentioned alkaline earth metal salts of saturated or unsaturated fatty acids having 10 to 26 carbon atoms, such as palmitic acid, myristic acid, stearic acid, oleic acid, linolic acid, linoleic acid, beef-tallow fatty acid, coconut oil fatty acid and palm oil fatty acid.

Preferred examples are magnesium hydroxide, magnesium oxide, magnesium silicate, basic magnesium silicate including talc, magnesium oleate, magnesium stearate, basic magnesium stearate, barium hydroxide, barium silicate, barium stearate, calcium hydroxide, calcium slicate and calcium stearate. Among them, magnesium compounds are especially preferred for attaining the objects of the present invention. Magnesium hydroxide, a magnesium or calcium salt of a higher fatty acid or a combination of magnesium hydroxide and a magnesium salt of a higher fatty acid is particularly preferred. If a covering layer of a magnesium salt of a higher fatty acid is formed on the surfaces of magnesium hydroxide particles, there can be attained a good dispersibility of the stabilizer into the resin and an excellent deterioration-preventing effect.

In the present invention, it is important that the above-mentioned alkaline earth metal type stabilizer should be used in combination with an antioxidant. Sterically hindered phenols are preferred as the antioxidant. Specific examples are alkyl gallates (propyl, octyl and dodecyl gallates), guaiacum, p-methoxyphenol, alkylated phenol, styrenated phenol, styrenated cresol, butylated styrenated cresol, phenylphenol, methyl salicylate, phenyl salicylate, p-tert-butylphenyl salicylate, methyl-p-hydroxybenzoate, propyl-p-hydroxybenzoate, hydroquinone monobenzyl ether, butylated hydroxytoluene, 2,5-di-tert-amylhydroquinone, 4-hydroxymethyl-2,6-di-tert-butylphenol, 2,6-di-tert-butyl-p-phenylphenol, 4,6-dinonyl-o-cresol, butylated hydroxyanisole, 4,4'-dihydroxydiphenylpropane-2,2' (bisphenol A), polybutylated (mixture) 4,4'-isopropylidene-diphenol, 2,2'-methylene-bis(4-methyl-6-tert-butylphenol), 2,2'-methylene-bis(4-ethyl-6-tert-butylphenol), 2,2'-methylene-bis(4-methyl-6-tert-octylphenol), 2,2'-methylene-bis(4-methyl-6-nonylphenol), 2,2'-methylene-bis(6-(1-methylcyclohexyl)-p-cresol), a mixture of 2,2'-methylene-bis(4-methyl-6-nonylphenol) and 2,6-bis(2-hydroxy-3-nonyl-5-methylbenzyl)-p-cresol, 4,4'-butylidene-bis(6-tert-butyl-m-cresol), tris(2-methyl-4'-hydroxy-5-tert-butylphenyl)butane, tetrakis(methylene-3-(3',5'-di-tert-butyl-4'-hydroxyphenyl)propionato)methane, 1,3,5-trimethyl-2,4,6-tris(3,5-di-tert-butyl-4-hydroxybenzyl)benzene, n-octadecyl-$\beta$-(4'-hydroxy-3',5'-di-tert-butylphenyl)proprionate, N-n-alkyl-N'-(carboxymethyl)-N,N'-trimethylene-diglycine, 2-n-octyl-thio-4,6-di(4'-hydroxy-3',5'-di-tert-butyl)-phenoxy-1,3,5-triazine, thio-bis(methylbutylphenol), 4,4'-thio-bis(6-tert-butyl-m-cresol), 2,4,5-trihydroxybutyrophenone, 2-hydroxy-4-methoxybenzophenone, 2-hydroxy-4-n-octoxybenzophenone, 2,2'-dihydroxy-4-methoxybenzophenone, 2-hydroxy-4-methoxy-2'-carboxybenzophenone, 2-(2'-hydroxy-5'-methylphenyl)-benzotriazole, 2-(2'-hydroxy-3'-tert-butyl-5'-methylphenyl)-5-chlorobenzotriazole and 2-(2'-hydroxy-3',5'-di-tert-butylphenyl)-5-chlorobenzotriazole. Furthermore, tocopherols may be used.

Resin Composition

In the resin composition, the ratio between the ethylene/vinyl alcohol copolymer (i) and the resin (ii)

selected from a propylene resin and a polar group-containing thermoplastic resin may be changed within a considerably broad range. In the case where the ethylene/vinyl alcohol copolymer (i) is used for imparting a gas barrier property and the polar group-containing resin (ii) is used for imparting an adhesiveness, the majority of the resin is occupied by the copolymer (i). In case of the resin composition comprising the olefin resin (v) in addition to the ethylene/vinyl alcohol copolymer (i) and the polar group-containing thermoplastic resin (ii), the ratio among these resin components may be greatly changed. For example, in case of a resin composition which is excellent in both the gas barrier property and interlaminar adhesiveness, the olefin resin content is relatively low, but when the regrind of a multi-layer structure comprising an olefin resin layer, an ethylene/vinyl alcohol copolymer layer and a polar group-containing thermoplastic adhesive layer is used, the olefin resin is present at a relatively high content.

In each case, it is preferred that the gelation-preventing stabilizer be present in an amount of 0.01 to 3% by weight, especially 0.05 to 1% by weight, particularly especially 0.05 to 0.5% by weight, and that the antioxidant be present in an amount of 0.01 to 3% by weight, especially 0.02 to 2% by weight, particularly especially 0.05 to 0.5% by weight. More specifically, if the amount of the stabilizer or antioxidant is too small and below the above-mentioned range, it is difficult to completely prevent discoloration or gelation, and if the amount of the stabilizer or antioxidant is too large and exceeds the above-mentioned range, bleeding of the stabilizer or antioxidant from the molded article is caused, resulting in drastic degradation of the appearance of the molded article or drastic reduction of the interlaminar adhesiveness in the multi-layer molded article.

In case of the four-component composition, the ethylene/vinyl alcohol copolymer (i) can be present in an amount of 1 to 90% by weight, especially 2 to 80% by weight, and the resin (ii) can be present in an amount of 5 to 98% by weight, especially 10 to 80% by weight. In case of the five-component composition, the ethylene/vinyl alcohol copolymer (i) can be present in an amount of 1 to 90% by weight, especially 2 to 80% by weight, the polar group-containing resin (ii) can be present in an amount of 1 to 90% by weight, especially 2 to 80% by weight, and the olefin resin (v) can be present in an amount of 5 to 98% by weight, especially 10 to 90% by weight.

In the present invention, other resins or additives such as a filler, a colorant and a lubricant may be added to the above-mentioned resin composition, so far as the properties of the resin composition are not substantially changed.

Molded Article and Vessel

According to the present invention, the above-mentioned resin composition is melt-extruded or injection-molded into a vessel, a film or a sheet. The molded article may have a single layer structure of the above-mentioned resin composition, or the above-mentioned resin may be co-extruded with other resin or resin composition to form a molded article having a laminate structure.

As the resin to be co-extruded with the resin composition of the present invention, there can be mentioned lowly water-absorbing resins such as olefin resins, polyesters and polycarbonates, ethylene/vinyl alcohol copolymers, adhesive resins and blends of two or more of the foregoing resins. Several examples of the layer structure are described below, though structures that can be adopted in the present invention are not limited to those exemplified below. Incidentally, in the following description, BL stands for the resin composition of the present invention, LMR stands for a lowly water-absorbing resin, EVOH stands for an ethylene/vinyl alcohol copolymer, and AD stands for an adhesive resin.

Single Layer Structure

BL

Two-Layer Structure

BL/LMR and BL/EVOH

Three-Layer Structure

BL/EVOH/BL, BL/EVOH+AD/BL, BL/EVOH+AD+LMR/BL, EVOH/AD/BL and EVOH/BL/LMR

Four-Layer Structure

LMR/BL/EVOH/LMR+AD and LMR/BL/EVOH+AD/LMR

Five-Layer Structure

BL/AD/EVOH/AD/BL, LMR/AD/EVOH/AD/BL and BL/EVOH/BL/EVOH/BL

Six-Layer Structure

LMR/AD/EVOH/AD/BL/LMR

Seven-Layer Structure

LMR/BL/AD/EVOH/AD/BL/LMR

Eight-Layer Structure

LMR/BL/LMR/AD/EVOH/AD/BL/LMR

Nine-Layer Structure

LMR/BL/LMR/AD/EVOH/AD/LMR/BL/LMR

As the adhesive resin, there is used a thermoplastic resin modified by grafting with an ethylenically unsaturated carboxylic acid or its anhydride such as acrylic acid, methacrylic acid or maleic anhydride, and polyethylene, polypropylene and an ethylene/vinyl acetate copolymer, which are thus modified, are preferred.

The resin composition of the present invention is melt-kneaded, for example, by a kneader and extruded into a predetermined shape through a die such as a T-die or circular die.

In case of simultaneous extrusion of multiple layers, melt kneading is carried out in extruders corresponding to the respective layers, and the melts are extruded through a multi-layer multi-ply die.

The molded article can take a form of a film, a sheet, a parison or pipe for formation of a bottle or tube, or a preform for formation of a bottle or tube.

Formation of a bottle from a parison, pipe or preform by extrusion molding or injection molding can be easily accomplished by gripping an extrusion-molded or injection-molded body by a pair of split molds and blowing a fluid such as air into the interior. Furthermore, a draw-blow-formed bottle is obtained by cooling a pipe or preform, heating the pipe or preform to the drawing temperature and drawing the pipe or parison in the axial direction while blow-drawing the pipe or parison in the circumferential direction by a compressed fluid.

A film or sheet is formed into a cup-shaped or tray-shaped packaging vessel by such means as vacuum forming, compressed air forming, expansion forming or plug assist forming.

Effects

In the resin composition of the present invention, since thermal deterioration of the ethylene/vinyl alcohol copolymer in the composition is effectively controlled during the molding operation or the like, when the composition is subjected to a vessel-forming operation, a vessel in which the gas barrier property is not influenced by the moisture can be obtained without degradation of the appearance characteristics and the mechanical characteristics such as the impact resistance. In case of a multi-layer structure, since deterioration of the resin composition layer is prevented, the adhesion strength is improved.

Furthermore, since thermal deterioration of the ethylene/vinyl alcohol copolymer in the resin composition is prevented, good extrusion characteristics can be maintained and so-called scorching is not caused, and an extrusion-molded article free of defects such as surging, fish eyes and depressions can be obtain.

Moreover, the present invention is advantageous in that a scrap composition such as a so-called regrind formed at the vessel-forming step can be reclaimed for formation of a vessel. In short, the present invention is very advantageous from the resource-saving viewpoint. When the resin composition of the present invention is used for formation of a vessel or the like, a scrap composition such as a regrind can be directly used again, so far as the stabilizer and antioxidant are contained in the above-mentioned amounts.

The present invention will now be described in detail with reference to the following examples that by no means limit the scope of the invention.

EXAMPLE 1 AND COMPARATIVE EXAMPLE 1

To 100 parts by weight of a mixture comprising an ethylene/vinyl alcohol copolymer having an ethylene content of 27 mole%, a saponification degree of 99.5 mole% and a melt index of 1.5 g/10 min (ASTM D-1238), an ionomer resin of the Na ion type having a density of 0.94 g/cc (ASTM D-1505) and a melt index of 1.2 g/10 min and low-density polyethylene having a density of 0.923 g/cc and a melt index of 1.0 g/10 min at a weight ratio of 60/20/20 were added 0.5 part by weight of magnesium stearate and 0.2 part of 2,6-di-tert-butyl-p-cresol (BHT), and the mixture was dry-blended and pelletized by using an extruder provided with a screw having a diameter of 65 mm and an effective length/diameter ratio (L/D) of 22 at set temperatures of 200° C., 200° C., 230° C. and 230° C. in order from the feed zone of the screw at a screw rotation number of 50 rpm and an extrusion rate of 65 kg/hr to obtain a kneaded pellet (hereinafter referred to as "pellet A"). For comparison, a kneaded pellet (hereinafter referred to as "pellet B") was prepared in the same manner as described above except that magnesium stearate and BHT were not added.

The pellet was kneaded at a chamber temperature of 230° C. and a rotor rotation number of 60 rpm for 30 minutes by using a Brabender plastograph (supplied by Brabender Co.) and a sheet having a thickness of about 300 μm was formed by using a high-pressure press set at 250° C.

A cup-shaped vessel was prepared from the sheet obtained from the pellet A according to the ordinary plug assist forming method.

Each of the sheets A and B was observed over an area of 1 cm² at 100 magnifications by a universal projector and the number of black specks of a deterioration product was counted.

In case of the sheet A, the number of black specks was 0 per cm², but in case of the sheet B, the number of black specks was 80 per cm².

From the point of initiation of the pelletizing operation, formation of a gelatinous substance in a die lip and adhesion of the gelatinous substance to the die lip were checked. In the pellet A, formation or adhesion of the gelatinous substance was not observed, but in case of the pellet B, after passage of about 1 hour from the point of initiation of the pelletizing operation, the gelatinous substance began to appear and therefore, the pelletizing operation was carried out while removing the adhering gelatinous substance at intervals of 1 hour.

EXAMPLE 2 AND COMPARATIVE EXAMPLE 2

A mixture (hereinafter referred to as "C") of 100 parts by weight of low-density polyethylene having a density of 0.925 g/cc and a melt index of 1.5 g/10 min (containing 5 parts by weight by vinyl acetate), 0.05 part by weight of magnesium stearate and 0.05 part by weight of BHT was supplied to a first extruder (screw diameter=65 mm, effective length/diameter ratio L/D=25) for formation of inner and outer layers and the pellet A obtained in Example 1 was supplied to a second extruder (screw diameter=30 mm, effective length/diameter ratio L/D=20) for formation of an intermediate layer, and both the resins were combined in a common die to form a two-resin three-layer parison. The parison was blow-formed under a blow pressure of 6 kg/cm² to obtain a multi-layer bottle having an inner capacity of 500 cc (hereinafter referred to as "bottle A-C").

For comparison, a multi-layer bottle (hereinafter referred to as "bottle B-D") was prepared in the same manner as described above except that the same low-density polyethylene (referred to as "D") as described above, to which magnesium stearate or BHT was not added, was supplied to the first extruder and the pellet B obtained in Example 1 was supplied to the second extruder.

In the barrel portion of each of the bottles A-C and B-D, the average thickness of the outer layer was 220μ, the average thickness of the intermediate layer was 20μ and the average thickness of the inner layer was 220μ.

The barrel portion was cut out and the adhesion strength between the intermediate layer and the outer or inner layer was measured by a Tensilon tester. It was found that the adhesion strength was 890 g/cm² in the bottle A-C and 720 g/cm² in the bottle B-D (each value was a mean value obtained with respect to 10 samples). Furthermore, the oxygen permeation rate was measured by the GC method. It was found that at a temperature of 37° C. and a relative humidity of 0%, the oxygen permeation rate was 7.5 cc/m²·day·atm in the bottle A-C and 9.0 cc/m²·day·atm in the bottle B-D, and that at a temperature of 30° C. and a relative humidity of 80%, the oxygen permeation rate was 7.1 cc/m²·day·atm in the bottle A-C and 9.5 cc/m²·day·atm in the bottle B-D After the operation had been continuously conducted for 21 days (about 500 hours), adhesion of the deterioration product to the screw of the second extruder was checked. It was found that the screw used for extrusion of the pellet A had no adhering deterioration product, but the deterioration product was deposited in a thickness of about 1.5 mm on the screw used for extrusion of the pellet B from the compression zone to the metering zone.

EXAMPLE 3 AND COMPARATIVE EXAMPLE 3

A mixture of 100 parts by weight of the mixture C used in Example 2 and 30 parts by weight of a pulverization product of flashes formed at the blow-forming of the bottle A-C was supplied to the first extruder used in Example 2 and the pellet A was supplied to the second extruder used in Example 2, and a blow-molded multi-layer bottle (hereinafter referred to as "bottle C-A-C") having an inner capacity of 500 cc was prepared in the same manner as described in Example 2. For comparison, a blow-molded multi-layer bottle (hereinafter referred to as "bottle D-B-D") having an inner capacity of 500 cc was prepared in the same manner as described above except that the resin D was used instead of the mixture C and flashes of the bottle B-D were used instead of the flashes of the bottle A-C.

In each of the barrel portions of the bottles, the average thickness of the outer layer was 240μ, the average thickness of the intermediate layer was 20μ and the average thickness of the inner layer was 240μ.

The barrel portion was cut out from each bottle and the adhesion strength between the intermediate layer and the inner or outer layer was measured by a Tensilon tester. It was found that the adhesion strength in the bottle C-A-C was 870 g/cm² (mean value determined with respect to 10 samples) and the adhesion strength in the bottle D-B-D was 680 g/cm² (mean value determined with respect to 10 samples).

After initiation of the molding operation, adhesion of a gelatinous substance to the die lip was checked. It was found that in case of the bottle C-A-C, no gelatinous substance adhered to the die lip. On the other hand, in case of the bottle D-B-D, after passage of 1 hour from the point of initiation of the molding operation, a gelatinous substance began to adhere to the die lip. Therefore, the molding operation was continued while removing the gelatinous substance at intervals of 30 minutes. After about 1 hour had passed from the point of initiation of the molding operation, 1000 bottles were sampled. Barrel portions were cut out from these bottles, and sheets were prepared from the barrel portions and the deterioration products were checked in the same manner as described in Example 1. In case of the bottle C-A-C, the deterioration product was found in one bottle among 1000 bottles, and in case of the bottle D-B-D, the deterioration product was found in 61 bottles among 1000 bottles.

After the operation had been continuously conducted for 21 days, the screw of the first extruder was drawn out and examined. In case of the bottle C-A-C, adhesion of the deterioration product to the screw was not found, but in case of the bottle D-B-D, the deterioration product was deposited in a thickness of 2 mm on the average on the screw from the compression zone to the metering zone.

EXAMPLE 4

To 100 parts by weight of polypropylene were added 0.07 part of calcium stearate, 0.05 part by weight of magnesium hydroxide and 0.2 part by weight of BHT as an antioxidant, and 5 parts by weight of an ethylene/vinyl alcohol copolymer (EVOH) having an ethylene content of 30 mole% was added to the mixture and the composition was blended by a Henschel mixer. The resulting polypropylene resin composition was supplied to a first extruder for formation of inner and outer layers and the above-mentioned EVOH was supplied to a second extruder for formation of an intermediate layer. In order to strengthen the adhesion between the polypropylene resin composition layer and the EVOH layer, maleic acid-modified polypropylene was supplied to a third extruder for formation of adhesive layers. Thus, a 5-layer parison was formed by melt extrusion molding. The parison was supplied into a blow mold and was subjected to blow molding under a blow pressure of 6 kg to form a multi-layer vessel having an inner capacity of 1000 cc.

When this melt extrusion molding was continuously conducted for 50 hours, adhesion of a foreign substance to the vessel wall was not observed, and scorching or adhesion to the extruder screw was not caused and formation of a gum on the die head was not found.

EXAMPLE 5 AND COMPARATIVE EXAMPLES 4 AND 5

A 5-layer blow-formed vessel was prepared from a parison formed by extruding different molten resins independently from three extruders and combining them in a common die. More specifically, 0.1 part by weight of calcium stearate, 0.1 part by weight of magnesium hydroxide and 0.1 part by weight of 2,6-di-tert-butyl-p-cresol (BHT) as an antioxidant were added to 100 parts by weight of polypropylene and the mixture was blended by a Henschel mixer. The mixture was extruded at 230° C. by an extruder to obtain a polypropylene pellet having a melt index of 1.2 g/10 min. This pellet was mixed with 30% by weight of a scrap resin composed mainly of polypropylene, which contained 5% by weight of an ethylene/vinyl alcohol copolymer (EVOH) having an ethylene content of 30 mole%, and the resulting blend was supplied to a first extruder for formation of innermost layers. The above-mentioned EVOH was supplied to a second extruder for formation of an intermediate layer. Modified polypropylene grafted with 0.8% by weight of maleic anhydride was supplied to a third extruder for formation of adhesive layers for bonding the intermediate layer to the innermost and outermost layers. Thus, a 3-resin 5-layer parison was formed, and the parison was subjected to blow forming under a blow pressure of 6 kg to obtain a multi-layer vessel having an inner capacity of 1000 cc. This extruder molding was continuously conducted for 24 hours.

For comparison, multi-layer vessels were prepared in the same manner as described above except that the amount of magnesium hydroxide added to 100 parts by weight of polypropylene supplied to the first extruder was changed to 0 part by weight (Comparative Example 4) or 0.005 part by weight (Comparative Example 5), and the extrusion molding was continuously conducted for 24 hours.

The obtained results are shown in Table 1.

TABLE 1

| | Appearance of Vessel | Scorching Adhesion to Screw of First Extruder | Adhesion (Gum) to Die Head |
|---|---|---|---|
| Example 5 | no adhesion | not observed | not observed |

TABLE 1-continued

|  | Appearance of Vessel | Scorching Adhesion to Screw of First Extruder | Adhesion (Gum) to Die Head |
|---|---|---|---|
| Comparative Example 4 | of foreign substance yellowish brown specks of foreign substance | conspicuous | conspicuous |
| Comparative Example 5 | " | conspicuous | conspicuous |

EXAMPLE 6 AND COMPARATIVE EXAMPLES 6 AND 7

A 4-resin 6-layer blow-formed vessel was prepared from a parison formed by extruding different molten resins independently from 4 extruders and combining them in a common die. More specifically, a pellet formed by adding 0.7 part by weight of calcium stearate, 0.7 part by weight of magnesium oxide and 0.1 part by weight of BHT as an antioxidant to 100 parts by weight of polypropylene, blending the mixture by a Henschel mixer and extruding the blend at 230° C. by an extruder was supplied to a first extruder, a scrap resin formed in this example (the composition obtained by adding 5 parts by weight of EVOH to 100 parts by weight of the above-mentioned pellet), was supplied to a second extruder, EVOH was supplied to a third extruder and maleic anhydride-modified polypropylene was supplied to a fourth extruder. Thus, a 4-resin 6-layer parison having a layer structure of polypropylene/scrap resin/modified polypropylene/EVOH/modified polypropylene/polypropylene from the outside was formed, and the parison was subjected to blow forming under a blow pressure of 6 kg to obtain a multi-layer vessel having an inner capacity of 1000 cc. This extrusion blow forming was continuously conducted for 24 hours.

For comparison, multi-layer vessels were prepared in the same manner as described above except that the amount of magnesium oxide added to 100 parts by weight of polypropylene was changed to 0 part by weight (Comparative Example 6) or 2 parts by weight (Comparative Example 7). In Comparative Example 6, yellow specks of a foreign substance appeared in the scrap resin layer of the vessel, a scorched substance was deposited on the screw of the second extruder, a considerable amount of a gum-like deterioration product was formed on the die head, and the continuous operation was often interrupted. In Comparative Example 7, scorching on the screw of the extruder and formation of a gum-like deterioration product on the die head were controlled, but the bottle was poor in the transparency and the commercial value of the vessel was low. On the other hand, disadvantages caused in Comparative Examples 6 and 7 were not observed in Example 6.

We claim:

1. A vessel which has a multi-layer structure comprising (a) an inner surface layer composed of a propylene resin, (b) a first adhesive layer, (c) an intermediate layer composed of an ethylene/vinyl alcohol copolymer having a vinyl alcohol content of 30 to 80 mole%, (d) a second adhesive layer, (e) an outer surface layer composed of a propylene resin and (f) a layer composed of a blend resin composition interposed between the inner surface layer and the first adhesive layer and/or between the outer surface layer and the second adhesive layer, wherein said blend resin composition contains a scrap resin produced at the vessel-forming step and comprises (i) an ethylene/vinyl alcohol copolymer, (ii) a resin selected from the group consisting of a propylene resin and a polar group-containing thermoplastic resin having in the main chain or side chain a carboxyl group derived from a compound selected from the group consisting of carboxylic acids, carboxylic acid salts, carboxylic anhydrides, carboxylic acid amides, carboxylic acid esters and carbonic acid esters, (iii) a combined stabilizer comprising an alkaline earth metal hydroxide or oxide and an alkaline earth metal salt of a higher fatty acid at a weight ratio of from 1/10 to 10/1, and (iv) an antioxidant composed of a sterically hindered phenol, the amounts of the ethylene/vinyl alcohol copolymer (i), the resin (ii), the combined stabilizer (iii) and the antioxidant (iv) being 1 to 90% by weight, 5 to 98% by weight, 0.01 to 3% by weight and 0.01 to 3% by weight, respectively, based on the sum of the components (i), (ii), (iii) and (iv).

2. A vessel as set forth in claim 1, wherein the resin (ii) is the polar group-containing thermoplastic resin, wherein the carbonyl group content in the thermoplastic resin is 5 to 1000 meq per 100 g of the resin.

3. A vessel as set forth in claim 1, wherein the combined stabilizer comprises magnesium hydroxide and an alkaline earth metal salt of a higher fatty acid.

4. A vessel as set forth in claim 1, wherein the combined stabilizer comprises an alkaline earth metal hydroxide or oxide and a magnesium or calcium salt of a higher fatty acid.

5. A vessel which has a multi-layer structure comprising (a) an inner surface layer, (b) a first adhesive layer, (c) an intermediate layer composed of an ethylene/vinyl alcohol copolymer having a vinyl alcohol content of 30 to 80 mole%, (d) a second adhesive layer and (e) an outer surface layer, one of the inner and outer surface layers comprising a blend resin composition and the other surface layer comprising a propylene resin, wherein said blend resin composition contains a scrap resin produced at the vessel-forming step and comprises (i) an ethylene/vinyl alcohol copolymer, (ii) a resin selected from the group consisting of a propylene resin and a polar group-containing thermoplastic resin having in the main chain or side chain a carbonyl group derived from a compound selected from the group consisting of carboxylic acids, carboxylic acid salts, carboxylic anhydrides, carboxylic acid amides, carboxylic acid esters and carbonic acid esters, (iii) a combined stabilizer comprising an alkaline earth metal hydroxide or oxide and an alkaline earth metal salt of a higher fatty acid at a weight ratio of from 1/10 to 10/1, and (iv) an antioxidant composed of a sterically hindered phenol, the amounts of the ethylene/vinyl alcohol copolymer (i), the resin (ii), the combined stabilizer (iii) and the antioxidant (iv) being 1 to 90% by weight, 5 to 98% by weight, 0.01 to 3% by weight and 0.01 to 3% by weight, respectively, based on the sum of the components (i), (ii), (iii), and (iv).

6. A vessel as set forth in claim 5, wherein the combined stabilizer is a mixture comprising magnesium hydroxide and a magnesium salt of a higher fatty acid at a weight ratio of from 1/10 to 10/1.

* * * * *